Oct. 5, 1965    J. J. WILLIAMS    3,210,137
SELF LUBRICATING BEARING
Filed March 18, 1963
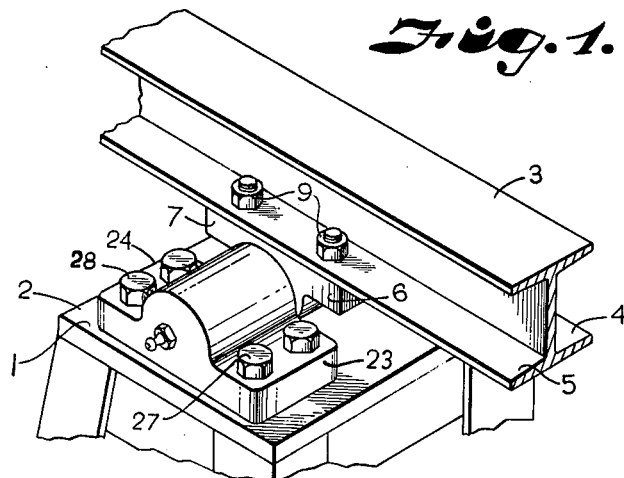
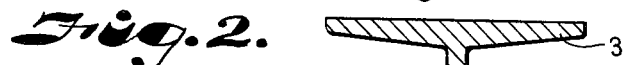
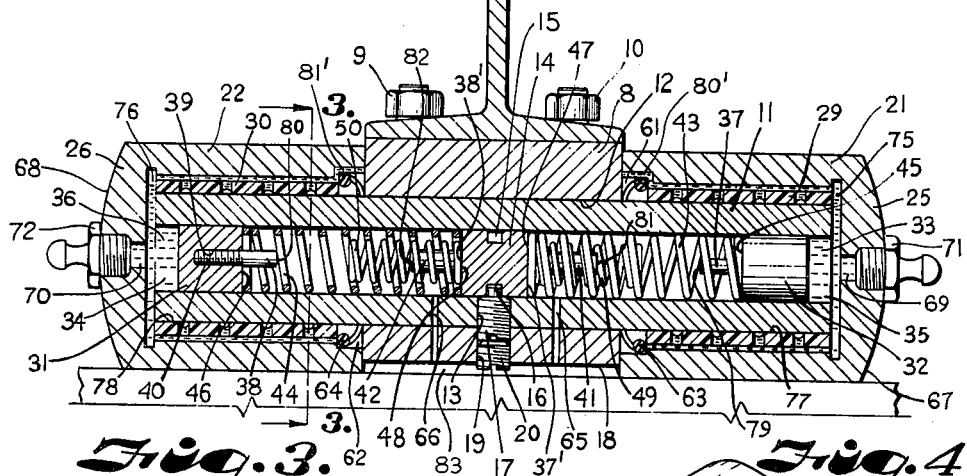
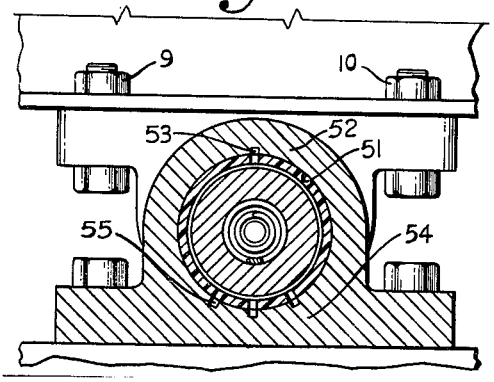
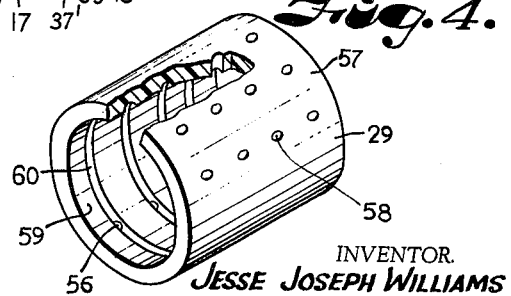
INVENTOR.
JESSE JOSEPH WILLIAMS
BY
Fishburn & Gold
ATTORNEYS

United States Patent Office 3,210,137
Patented Oct. 5, 1965

3,210,137
SELF LUBRICATING BEARING
Jesse Joseph Williams, Yates Center, Kans.
(8 S. Chestnut, Iola, Kans.)
Filed Mar. 18, 1963, Ser. No. 265,771
5 Claims. (Cl. 308—21)

This invention relates to a self lubricating bearing and more particularly to an apparatus for lubricating a bearing used on a Samson post, and the saddle bearing in connection with a walking beam of an oil field pumping jack.

The walking beam travels in an arc of only 45 to 60 degrees, making these two bearings difficult to lubricate. This causes excessive wear on the bottom of the bearings because grease goes to the space left on top and not to the bottom where lubrication is most needed.

The principal objects of the present invention are: to provide a bearing on a Samson post for attachment to a walking beam of a pumping jack wherein a bearing sleeve is rotatably secured to a collar or bearing casting, which in turn is secured to the walking beam so that rotation of the walking beam will also rotate the bearing sleeve back and forth; to provide the ends of the bearing sleeve extending outwardly of the collar with nylon bushings having spaced openings on the upper side thereof and a plurality of spaced openings on the bottom thereof; to provide the bushings with circular grooves on the inner surface thereof; to provide bearing housings on each end of said sleeve bearing and surrounding said nylon bushings, the inner walls of which are slightly larger than said bushings; to provide pistons in the bearing sleeve and springs for urging said pistons outwardly toward the ends of said bearing housings; to provide a plug or anchor in the center of said bearing sleeve; to provide stop means on said plug engaging with means on said piston for holding said springs in alignment and against which said means engage when building up pressure on the lubricant to be contained in the compartments in the bearing sleeve; to provide openings from said compartment in the bearing sleeve to the nylon bearing bushings; and to provide means in the ends of said bearing housing for submission of grease to the compartments and thence to the bearing sleeve.

Still further objects of the present invention are to provide a sleeve bearing member which provides a housing or container for the lubricant; to provide openings in the nylon bearing bushing with grooves on the inner surface thereof intersecting some of said openings; to provide a sufficient amount of lubrication at any desired location in the bearing sleeve and bearing bushing where the greatest wear occurs; to provide breather means for the pistons in the cylinders through the sleeve and collar; to provide means for fastening the collar to the sleeve bearing and to provide a device of this character simple and economical to manufacture.

Other objects and advantages of this invention will become apparent from the following description taken in connection with the accompanying drawings wherein are set forth by way of illustration and example certain embodiments of this invention.

FIG. 1 is a perspective view of my bearing shown attached to a Samson post and a walking beam which are shown in fragmentary sections.

FIG. 2 is an enlarged longitudinal cross-sectional view through the apparatus.

FIG. 3 is an enlarged sectional view taken on a line 3—3, FIG. 2.

FIG. 4 is an enlarged fragmentary view of the nylon bushing member.

Referring more in detail to the drawings:

The reference numeral 1 generally designates a bearing embodying the features of my invention shown attached to a Samson post 2 and walking beam 3, the walking beam having flanges 4 and 5 to which the outwardly extending flanges 6 and 7 of a collar or bearing casting 8 are rigidly attached by bolts or the like 9 and 10.

A sleeve 11 is provided for engagement in the opening 12 of the collar 8, the sleeve having a transverse threaded bore opening at substantially the center thereof as indicated at 13. An anchor or plug 14 is provided at substantially the center of the bearing sleeve 11 and also the collar 8 and is press-fitted into the sleeve bearing. The plug is provided with an annular groove 15 adapted to receive a lug or dog pointed end 16 of a set screw 17 which engages the threaded opening 13 in the sleeve and when in place extends outwardly a short distance from said sleeve. The underneath side 18 of the collar has a threaded opening 19 aligning with the threaded opening 13 and receiving the other end of the set screw 17 and for receiving a lock screw 20 for rigidly fastening the collar and bearing sleeve together and in turn the bearing sleeve to the flanges 4 and 5 of the walking beam 3 by the bolts 9 and 10.

Bearing housings 21 and 22 are provided for the ends of the sleeve bearing extending outwardly from the collar 8. The housings 21 and 22 include laterally extending ears 23 and 24 and closed ends 25 and 26. The ears 23 and 24 have openings therein for receiving stud bolts or the like 27 and 28 for securing the bearing housings to the Samson post.

The inner diameter of the housings 21 and 22 are larger than the outer diameter of the bearing sleeve 11, as particularly illustrated in FIGS. 2 and 3. Bearing bushings 29 and 30, perferably made of nylon or other similar material, are press fitted tightly in the ends of the bearing housings 21 and 22 to retain the same therein as illustrated in FIG. 3. The bearing bushings 29 and 30 surround the ends of the sleeve 11 outwardly of the collar 8.

Mounted for reciprocation within the sleeve bearing and spaced from the plug 14 are pistons 31 and 32 forming compartments 33 and 34 in said sleeve for a lubricant or grease material as indicated at 35 and 36. The pistons have pins 37 and 38 extending inwardly toward the plug 14. The pistons are threadedly bored as indicated at 39 for receiving the threaded ends 40 of the pins 37 and 38. Mounted on each side 37' and 38' of the anchor or plug 14 and extending toward the pins 37 and 38 are studs 41 and 42. Coil springs 43 and 44 have one of their ends surrounding the pins 37 and 38 and resting against the ends 45 and 46 of the pistons and their others ends surround the studs 41 and 42 and have their ends bearing against the faces 47 and 48 of the anchor or plug 14 to exert constant pressure on the pistons 31 and 32 outwardly in the compartments 33 and 34 as later described. Booster springs 49 and 50 are provided for engagement around the studs 41 and 42 and extending within the coil springs 43 and 44 as best illustrated in FIG. 2 also for a purpose later described.

The inside 51 of the housings 25 and 26 are provided near their upper sides 52 with longitudinal grooves 53 and the lower sides 54 with a plurality of spaced longitudinal grooves 55. The nylon bearing bushings 29 and 30 are provided at their upper sides and aligning with the grooves 53 in the housing with a plurality of spaced openings 56. The lower sides 57 of the bushings 29 and 30 are provided with a plurality of rows of spaced openings 58 aligning with the longitudinal grooves 55 in the lower sides 54 of the housings 21 and 22 as particularly illustrated in FIG. 3. The inside wall 59 of the bushings 29 and 30 are provided with a plurality of circumferential grooves 60 as illustrated in FIG. 4 and particularly intersecting the aligned openings 56 and 58 in said nylon bushings.

The inside of the bearing housings 21 and 22 are counterbored as indicated at 61 (FIG. 2) for receiving grease seal rings 63 and 64 sometimes referred to as Victor grease retainers. Aligned breather holes 65 and 66 are provided in the walls of the bearing sleeve 11 spaced slightly outwardly of the anchor or plug 14 and which bores extend through the lower face of the collar also as shown in FIG. 2.

The respective ends 67 and 68 of the housings 21 and 22 are provided with longitudinal bore openings 69 and 70 which are provided with grease fittings 71 and 72, sometimes referred to as zerk fittings, for application of grease to the compartments 33 and 34.

In assembling the structure as described, the plug or anchor 14 is first assembled in the bearing sleeve at substantially the center thereof as previously described. The collar or bearing casting 8 is mounted on the bearing sleeve 11 and the set screw 17 and lock screw 20 placed in the threaded bores 13 and 19 respectively to hold the sleeve rigidly in the collar or bearing casting 8. The booster springs 49 and 50 are placed over the booster studs 41 and 42 and the coil springs 43 and 44 placed over the coil springs 49 and 50, with their ends resting against the side faces 37' and 38' of the anchor or plug 14. The pistons 31 and 32 are then placed in the sleeve bearing or compartments 33 and 34 with the pins 37 and 38 extending into the ends of the coil springs 43 and 44 with their ends resting against the ends 45 and 46 of the inner faces of the pistons. The grease seals 63 and 64 are placed in the counter bores 61 and 62 of the inside faces of the housings 21 and 22 and the nylon bearing bushings pressed into said housings and the housings placed over the ends of the bearing sleeve 11 with their inner ends fitting tightly against the side faces of the collar or bearing casting 8.

The assembly is then placed upon the Samson post and secured thereto by the bolts 27 and 28. The walking beam 3 is then secured to the flanges 6 and 7 of the bearing casting 8 by the bolts 9 and 10.

A lubricant, such as relatively stiff grease or the like, is applied or submitted to the compartments 33 and 34 by an applicator, such as a grease gun (not shown), attached to the zerk fittings 71 and 72 in the respective ends 25 and 26 of the housings 21 and 22. Pressure of the grease as indicated at 35 and 36 against the pistons 31 and 32 will cause the pistons to move against the pressure of the coil springs 43 and 44 until sufficient grease is housed within the compartment 33 and 34 to cause the grease to move through the spaces 75 and 76 at the end of the bearing sleeve 11 and the inner wall of the end of the housings 21 and 22 and will pass through the longitudinal grooves 53 and 55 on the inner faces of the bearing housings and through the openings 56 and 58 in the nylon bearing bushings 29 and 30 to contact the surfaces 77 and 78 of the ends of said bushings as illustrated in FIG. 2, thus providing application of grease to the desired location of the bearing sleeve most needed, which is usually at the bottom of said bearing.

By application of additional pressure by the applicator, an additional amount of grease may be applied to the compartments 33 and 34 until the springs 43 and 44 are compressed to a point where the booster springs 49 and 50 will be brought into force to add greater resistance against the grease to thereby force the same through the openings as above described and through the holes to clear out any stiff or cold grease that may collect in such spots around the bearing sleeve. Openings 80' and 81' are provided in the housings 21 and 22 connecting with the longitudinal grooves 53 in said housings, said openings leading to the edges of the housings abutting against the collar 8 as shown in FIG. 2 so that due to such extreme pressure on the lubricant the old lubricant may pass through said openings and pass out between the housings and the collar as well as lubricate the same. The ends 79 and 80 of the pins 37 and 38 act as positive stops when the coil springs are compressed and such ends are contacted by the ends 81 and 82 of the studs 41 and 42.

It will be noted that the lower sides of the bearing housings are recessed as indicated at 83 to accommodate the end of the lock screw 20 extending outwardly of the openings 19.

It will be obvious from the foregoing that I have provided an improved self lubricating bearing which will automatically and positively apply lubricant to a bearing sleeve at the point of most wear and most needed by the application of the bearing sleeve and nylon bushing with the openings and grooves therein as above described. The present apparatus will eliminate frequent lubrication of the bearings because of the supply of lubricant maintained in the compartments.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A self-lubricating bearing for attachment to the Samson post of a pumping jack including a walking beam comprising:
   (a) a collar attached to said walking beam,
   (b) a bearing sleeve extending through said collar and having ends extending substantially equidistant outwardly thereof and having a plug anchored at substantially the longitudinal center thereof forming cylinders on each side of said plug,
   (c) means attaching said bearing sleeve to said collar to rotate therewith,
   (d) pistons in said cylinders forming compartments for lubricant in said cylinders outwardly of said pistons,
   (e) housings secured to said Sampson post having closed ends for the ends of said bearing sleeve, the other ends of said housing engaging against said collar, the inner diameter of said housings being greater than the outer diameter of said bearing sleeve and having a space between the ends of said bearing sleeve and the ends of said housings,
   (f) bushings having inner and outer surfaces pressed into said housing and surrounding said bearing sleeve outwardly of the collar,
   (g) means urging said pistons toward the closed ends of said housings, and
   (h) means in said bushings and said housings for passage of lubricant from said compartments through said spaces at the ends of said bearing sleeve to the outer surface of said bearing outwardly of said collar.

2. The apparatus of claim 1 wherein the means in said bushings and said housings for passage of lubricant therethrough consists of longitudinally spaced grooves in said housings, spaced openings in said bushing aligning with said grooves, and circumferential grooves on the inner surface of said bushings intersecting said openings.

3. The apparatus of claim 1 wherein the means urging the pistons toward the closed ends of the housings consists of a coil spring in each of said compartments having one end engaging against said pistons and the other against opposite sides of said plug.

4. The apparatus of claim 2 including a coil spring in each of said campartments of less diameter and length than the first mentioned coil springs and having one end engaging on each side of said plug inside said first mentioned coil springs whereby said second springs will be effective to exert pressure on said pistons when the first mentioned coil are partially compressed.

5. The apparatus of claim 1 wherein said bushings are non-rotatable in said housings.

References Cited by the Examiner
UNITED STATES PATENTS

| | | | |
|---|---|---|---|
| 1,233,127 | 7/17 | Ross | 308—21 |
| 2,249,842 | 7/41 | Mansfield | 308—21 |
| 2,403,397 | 7/46 | Rankin | 308—187 |
| 2,635,927 | 4/53 | Leighton | 308—2 |
| 2,859,598 | 11/58 | Hochreuter | 74—605 |

DON A WAITE, *Primary Examiner.*

ROBERT C. RIORDON, *Examiner.*